ness, Dickey & Pierce

United States Patent [19]
Liggett

[11] 3,790,226
[45] Feb. 5, 1974

[54] SKID CONTROL SYSTEM INCLUDING CYCLING AND CHECKING CIRCUIT FOR PLURAL MODULATING VALVES

[75] Inventor: John V. Liggett, Plymouth, Mich.

[73] Assignee: Kelsey-Hayes Company, Romulus, Mich.

[22] Filed: Mar. 1, 1972

[21] Appl. No.: 230,852

[52] U.S. Cl............ 303/21 AF, 324/51, 340/52 B, 340/410
[51] Int. Cl................................................ B60t 8/00
[58] Field of Search... 180/82; 188/181; 303/20, 21; 324/51, 73 R; 340/52 R, 52 B, 410

[56] References Cited
UNITED STATES PATENTS

| | | | |
|---|---|---|---|
| 3,667,812 | 6/1972 | Carp et al. | 303/21 AF |
| 3,680,923 | 8/1972 | Peterson et al. | 303/21 AF |
| 3,516,715 | 6/1970 | Fielek, Jr. et al. | 303/21 AF |

Primary Examiner—Duane A. Reger
Assistant Examiner—Stephen G. Kunin
Attorney, Agent, or Firm—Harness, Dickey & Pierce

[57] ABSTRACT

A skid control system including a first brake pressure modulating valve for the front wheels, a second brake pressure modulating valve for the rear wheels and an apparatus for automatically cycling and checking the valves in sequence independently of the skid control function in order to prevent deterioration of the valve from inaction. The cycling sequence is established so that both valves are not cycled simultaneously whereby the braking pressure to all of the brakes will not be simultaneously relieved.

18 Claims, 1 Drawing Figure

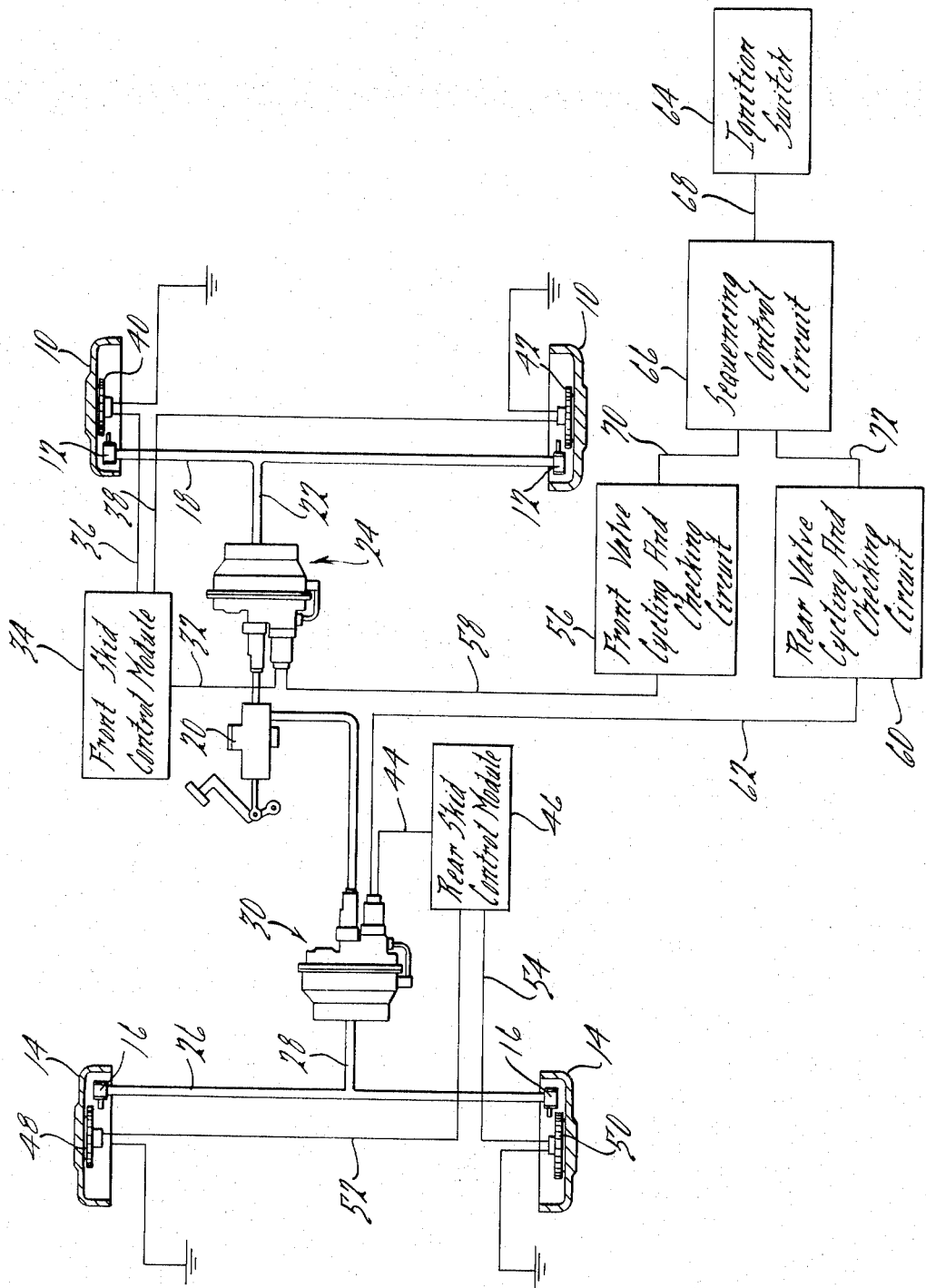

3,790,226

SKID CONTROL SYSTEM INCLUDING CYCLING AND CHECKING CIRCUIT FOR PLURAL MODULATING VALVES

SUMMARY BACKGROUND OF THE INVENTION

The present invention relates to a skid control system having a circuit for cycling and checking at least two modulating valves of the skid control system. A related system appears in the patent to Fielek, Jr., et al U.S. Pat. No. 3,516,715 entitled "Skid Control System Including Valve Cycling and Checking Circuit" issued June 23, 1970, and assigned to the same assignee as the assignee of this application, the teachings of which are incorporated herein by reference thereto.

In the skid control system of the aforementioned patent, the rear brakes were provided with a brake pressure modulator for relieving the pressure delivered to the brakes upon detection of an incipient skid condition. In order to prevent deterioration of the valve from inaction, a system was provided for cycling the valve. The system further included means for checking the operation of the valve during cycling to determine whether any malfunction in valve operation existed. As taught by the patent to Fielek, Jr., et al, the valve may be cycled upon actuation of the ignition switch.

In most four wheel skid control systems, at least two modulating valves are used which together control the braking pressure at all of the braked wheels. Under some conditions, for example, when the vehicle is being held on a grade by application of the brakes by the vehicle operator, it is undesirable to allow the pressure delivered to all the brakes of the vehicle to be relieved simultaneously during a modulating valve check cycle. The present invention provides the means for cycling and checking all of the modulating valves of a plural valve anti-skid system, and yet, simultaneous relief of the brake pressure delivered to all of the brakes of the vehicle is prevented. This is accomplished by sequencing the valve operation so that one valve is not open to relieve brake pressure until another valve has closed to reapply brake pressure.

In prior experience, the cycling of a single modulating valve creates a substantial mechanical noise which at times is disconcerting to the vehicle operator and the passengers in the vehicle. The mechanical noise is especially obtrusive since valve cycling occurs while the vehicle is at rest. With the incorporation of four wheel skid control systems with plural valves, an increase in the noise level may be expected which would additionally annoy and disconcert the operator and the passengers in the vehicle. Through sequencing of the valves, the maximum amplitude of the noise is reduced, and consequently the objectionable character of the noise is minimized.

A BRIEF DESCRIPTION OF THE DRAWING

The drawing is a diagram of an exemplary skid control system having a valve cycling control according to the present invention.

DETAILED DESCRIPTION OF THE PREFERRED EMBODIMENT

In the FIGURE, a schematic diagram is illustrated of a skid control system for controlling the front and rear wheel brakes of an automobile. As seen in the FIGURE, the front wheels are equipped with brake drums 10 and brake cylinders 12, and the rear wheels are equipped with brake drums 14 and brake cylinders 16. The front wheel brake cylinders 12 are supplied with hydraulic pressure by a hydraulic line 18 which receives hydraulic pressure from a master cylinder 20 for the vehicle through a line 22. A front brake pressure modulating valve 24 is interposed in the front brake line 22 to control the fluid pressure to the front brake cylinders 12 in accordance with a skid control signal. The rear brake cylinders 16 are supplied with hydraulic pressure by a fluid line 26 which receives hydraulic pressure from the master cylinder 20 through a fluid line 28. A rear brake modulating valve 30 is interposed in rear brake line 28 to control the fluid pressure to the rear brake in accordance with a skid control signal.

The front brake modulating valve 24 receives a skid control signal on a line 32 from a front skid control module 34. The front skid control module 34 receives signals representative of the wheel speed of each of the front wheels on lines 36 and 38 from left front wheel speed sensor 40 and right front wheel speed sensor 42, respectively. The rear brake modulating valve 30 receives a skid control signal on a line 44 from a rear skid control module 46. The rear skid control module 46 receives wheel speed signals from left and right rear wheel speed sensors 48 and 50 on lines 52 and 54, respectively.

With regard to the operation of each of the front and rear skid control modules 34 and 46, and each of the front and rear modulating valves 24 and 30, respectively, reference is made to the aforementioned patent to Fielek, Jr., et al. In the patent to Fielek, Jr., et al, a description of a skid control showing a skid control module and modulating valve for the rear brakes is disclosed. It will be appreciated that the front brake skid control module 34 and front brake modulating valve 24 may be essentially duplicative of the skid control module and the modulating valve for the rear brakes as described in the aforementioned patent to Fielek, Jr., et al.

The front modulating valve 24 receives a cycling control signal from a front valve cycling and checking circuit 56 on line 58 while the rear modulating valve 30 receives a cycling control signal from a rear valve cycling and checking circuit 60 on line 62. The valve cycling and checking circuits 56 and 60 may be like the valve cycling and checking circuit disclosed in detail in the aforementioned patent to Fielek, Jr., et al. However, in the present invention, the valve cycling and checking circuits 56 and 60 are not connected directly to the ignition switch 64 of the vehicle as disclosed in the above patent to Fielek, Jr., et al. Rather, a sequencing control circuit 66 is interposed between the valve cycling and checking circuits 56 and 60 and ignition switch 64. More specifically, the sequencing control circuit 66 is connected to the ignition switch 64 by a line 68 to receive a signal indicating actuation of the ignition switch and to the front and rear valve cycling and checking circuits 56 and 60 by lines 70 and 72, respectively. The sequencing control circuit 66 may be a two-position stepping switch whereby the signal on line 68 indicating that the ignition switch has been actuated will be first delivered to the line 70, and thereafter, at a mutually exclusive time, will be delivered to the line 72.

The valve cycling and checking circuits 56 and 60, as described in the above patent to Fielek, Jr., et al are operative to cause the diaphragm and piston assembly of the associated modulating valve 24 or 30 to move to their extreme actuated position, and thereafter, to return to their deactuated position. Such motion is beneficial in maintaining the seals and valves of the modulating valves 24 and 30 in an operative condition. Each of the cycling and checking circuits 56 and 60, in addition to valve cycling, provides an indication of the proper functioning of the associated modulating valve 24 or 30, as also described in the aforementioned Fielek, Jr., et al patent.

In view of the above, it will be appreciated that the front and rear modulating valves 24 and 30, respectively, are not cycled simultaneously. Consequently, actuation of the ignition switch 64 does not cause all of the brakes of the vehicles to be released so that the vehicle may be held on a grade by application of the brakes by the vehicle operator. Without means for preventing relief of the braking pressure to all of the brakes when braking pressure is needed, the vehicle would be allowed to roll, possibly with harmful results, and certainly in a disturbing manner. Also the sequential cycling of the modulating valves 24 and 30 reduces the maximum amplitude of the mechanical noise emitted by the system, and changes the character of the noise, so that the disturbance to persons in the vehicle created by the noise is minimized.

In view of the above, it will be appreciated that the present invention contemplates an apparatus which is operative at least under some determinable condition, e.g. time or event, in a manner so that all of the modulating valves for the vehicle brakes will not be simultaneously released during a cycling and checking operation for the valves. In the preferred embodiment disclosed herein, simultaneous actuation of both of the valves during the valve cycling and checking operation is prevented under all conditions.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

I claim:

1. A skid control system for a wheeled vehicle comprising:
a plurality of fluid control valves controllably actuable in response to a skid control signal for controlling the pressure to the brakes of the wheels of the vehicle, actuating means automatically actuable by the vehicle operator in operating the vehicle, valve cycling means connected to the actuating means of the vehicle and being actuated in response to actuation of the actuating means for cycling the valves without the prior occurrence of the control signal whereby the valves will be cycled at determinable times in order to prevent deterioration of the valves from inaction, said valve cycling means including means for preventing simultaneous actuation of all of said valves at said determinable times at least under a determinable condition.

2. A skid control system according to claim 1 wherein said means for preventing simultaneous actuation of said valves prevents simultaneous actuation of said valves at said determinable times of valve cycling under all conditions.

3. A skid control system according to claim 2 wherein said valves are actuated sequentially.

4. A skid control system according to claim 3 having two fluid control valves independently controllably actuated in response to separate skid control signals.

5. A skid control system according to claim 1 having two fluid control valves independently controllably actuated in response to separate skid control signals.

6. A skid control system according to claim 1 having a first fluid control valve for controlling the pressure to the brakes of the front wheels of the vehicle in response to a front skid control signal and a second fluid control valve for controlling the pressure to the brakes of the rear wheels of the vehicle in response to a rear skid control signal.

7. A skid control system according to claim 6 wherein said valves are actuated sequentially.

8. A skid control system according to claim 1 wherein said actuating means is the ignition switch of the vehicle.

9. A skid control system according to claim 1 wherein said valves have a determinable cycle of operation and further including valve checking means for sensing a deviation from said determinable cycle of operation of said valves during cycling thereof.

10. A skid control system according to claim 1 wherein each of said valves includes a movable member and wherein said valve cycling means causes said movable member to move to an extreme actuated position for release of brake pressure to an associated brake and to return to a deactuated position for reapplication of brake pressure to said associated brake.

11. A skid control system for a wheeled vehicle comprising:
at least two fluid control valves independently controllably actuated in response to separate skid control signals having a determinable cycle of operation for controlling the pressure to respective ones of the brakes of the wheels of the vehicle, actuating means automatically actuable by the vehicle operator, valve cycling means connected to the actuating means of the vehicle and being actuated in response to actuation of the actuating means for cycling the valves without the prior occurrence of the control signal whereby the valves will be cycled at determinable times in order to prevent deterioration of the valves from inaction, said valve cycling means including means for sequentially actuating said valves at said determinable times, and valve checking means for sensing a deviation from said determinable cycle of operation of said valves during cycling thereof.

12. A skid control system according to claim 11 having a first fluid control valve for controlling the pressure to the brakes of the front wheels of the vehicle in response to a front skid control signal and a second fluid control valve for controlling the pressure to the brakes of the rear wheels of the vehicle in response to a rear skid control signal.

13. A skid control system according to claim 12 wherein said actuating means is the ignition switch of the vehicle.

14. A skid control system according to claim 13 wherein each of said valves includes a movable member and wherein said valve cycling means causes said movable member to move to an extreme actuated position for release of brake pressure to an associated brake and to return to a deactuated position for reapplication of brake pressure to said associated brake.

15. A skid control system for a wheeled vehicle comprising:

at least two fluid control valves independently controllably actuated in response to separate skid control signals having a determinable cycle of operation for controlling the pressure to respective ones of the brakes of the wheels of the vehicle, actuating means automatically actuable by the vehicle operator, valve cycling means connected to the actuating means of the vehicle and being actuated in response to actuation of the actuating means for cycling the valves without the prior occurrence of the control signal whereby the valves will be cycled at determinable times in order to prevent deterioration of the valves from inaction, said valve cycling means including a sequencing control means for actuating said valves in sequence at said determinable times so that said valves are actuated at mutually exclusive times, and valve checking means for sensing a deviation from said determinable cycle of operation of said valves during cycling thereof.

16. A skid control system according to claim 15 having a first fluid control valve for controlling the pressure to the brakes of the front wheels of the vehicle in response to a front skid control signal and a second fluid control valve for controlling the pressure to the brakes of the rear wheels of the vehicle in response to a rear skid control signal.

17. A skid control system according to claim 16 wherein said actuating means is the ignition switch of the vehicle.

18. A skid control system according to claim 17 wherein each of said valves includes a movable member and wherein said valve cycling means causes said movable member to move to an extreme actuated position for release of brake pressure to an associated brake and to return to a deactuated position for reapplication of brake pressure to said associated brake.

* * * * *